Patented Oct. 30, 1945

2,388,017

UNITED STATES PATENT OFFICE 2,388,017

PROCESS FOR THE MANUFACTURE OF PAINTS

Herwart Sohm, Basel, Switzerland

No Drawing. Application February 6, 1943, Serial No. 475,015. In Switzerland December 19, 1941

4 Claims. (Cl. 106—218)

The object of the present invention consists in a process for the manufacture of paint coatings from hydrocarbons and colophony.

It is known to obtain paint coatings from colophony dissolved in petroleum, crude oil or naphtha. Moreover, as known, it is possible to bind in form of salts the resin-acids, being a substantial part of the colophony, when using the aforesaid solutions, or to esterify the same. However, solutions from colophony containing free resin-acid cannot be used for the preparation of spreadable paint coatings by means of commercial pigments, as the resin-acid prematurely enters into combination with numerous pigments while gelatinizing. By the conversion of the resin-acid into alkali or earth-alkali salts respectively as well as by the esterification of the resin-acid, products are obtained which are difficultly soluble or insoluble in hydrocarbons or which form brittle films.

The present invention consists in a new process for the manufacture of paint coatings from colophony and hydrocarbons, which coatings give as such or in combination with suitable pigments as well as when mixed with linseed oil and turpentine oil painting substances stable to storage, and which form elastic films.

The new process is based upon the observation that colophony may be converted in such a manner by the treatment with sulphur in a melting process and by a subsequent treatment of the melt in a solution of hydrocarbons with aluminium salts, aluminium oxide or aluminium hydroxide, so that a painting substance is produced which may easily be mixed with most of the pigments without showing a premature hardening. The painting substances obtainable according to the present process give as such or in mixture with known elements coatings of good adhering and elastic properties.

The present process may be carried out, for example, as follows, the parts being by weight:

25 parts of colophony are melted with 0.5 to 4 parts of sulphur and heated, while stirring, to about 140°–170° C. until a homogeneous product results. The quantity of the sulphur used within the aforesaid limits, as well as the duration and temperatures vary according to the origin and quality of the colophony.

Subsequently to the melting process the still warm molten mass from 25 parts of colophony is stirred, preferably while heating to 120° C., with 25 to 40 parts of petroleum, white-spirit, heavy oil or naphtha respectively until a complete dissolution has been reached. The solution is now heated to 130°–160° C. and gradually treated with 0.4 to 2 parts of dry aluminium hydroxide, while the whole mixture is stirred until all has dissolved. Instead of the aluminium oxide or aluminium hydroxide there may also be used equivalent quantities of an aluminium salt, such as aluminium carbonate, aluminium chloride or a calcium aluminate. The dissolving of the aluminium component requires about 10 to 30 minutes.

By the treatment with sulphur the colophony has already been transformed in such a manner that its viscosity in the petroleum solution has greatly been increased, when compared with colophony which has not been treated with sulphur. Moreover, the transformation of the colophony by the sulphur treatment is also proved by the rising of its melting point of about 20° C.

Due to the subsequent treatment with aluminium hydroxide a partial neutralisation of the resin-acids is effected giving thus a favourable spreading capacity, a better durability of the paints, an improved elasticity, a favourable compatibility of these products with pigments of all kind and finally also a particular strong brightening of the colour.

It suffices to use the aluminium hydroxide in the above indicated quantities in order to already obtain paints which are suitable for many purposes, although in this case still free resin-acid is present in the paints. On the other hand, it is however advantageous to further reduce the content of free acid by adding earth-alkali hydroxides, whereupon the obtained products possess a complete compatibility with all of the known pigments.

For this purpose, it is advantageous to add still 0.5 to 2 parts of calcium oxide to the hot solution of the colophony treated with sulphur and with aluminium oxide, aluminium hydroxide or aluminium salts respectively, and to boil this mixture until the lime has also been combined. The calcium oxide may also be replaced by calcium carbonate or by an equivalent quantity of barium hydroxide or barium carbonate.

Furthermore it is possible to cause the aluminium component and the earth-alkali component to react simultaneously together or in any suitable operative sequence of the reactions.

Finally the paint is allowed to cool down and, preferably after some days, purified by decanting or filtration from any mud, which is possibly present and consists of various impurities of the technical chemicals.

What I claim is:

1. A process for the manufacture of paint, which comprises melting colophony with sulphur, dissolving the resultant molten mass in at least one hydrocarbonaceous material selected from the group consisting of petroleum, heavy oil and naphtha, treating the resultant sulfurized colophony solution at 130–160° C. with an aluminum compound selected from the group consisting of aluminum oxide, aluminum hydroxide, aluminum carbonate, aluminum chloride and calcium aluminate, the quantity of such aluminum compound employed being less than is necessary to effect a complete neutralization of the resin acids present in said solution, and then treating the resultant product with a sufficient quantity of a member selected from the group consisting of calcium carbonate, barium carbonate, barium hydroxide and calcium oxide substantially to neutralize remaining resin acids.

2. A process for the manufacture of paint, which comprises melting colophony with sulphur, dissolving the molten mass in petroleum spirit, treating the resultant product at 130–160° C. with aluminum hydroxide in an amount less than is necessary to effect complete neutralization of the resin acids present in said solution, and then treating the resultant product with sufficient barium hydroxide substantially to neutralize remaining resin acids.

3. A paint composition produced according to the process of claim 1.

4. A paint composition produced according to the process of claim 2.

HERWART SOHM.